(No Model.)
G. M. STOREY.
DEVICE FOR TESTING HAMS OR OTHER MEATS.
No. 495,382. Patented Apr. 11, 1893.
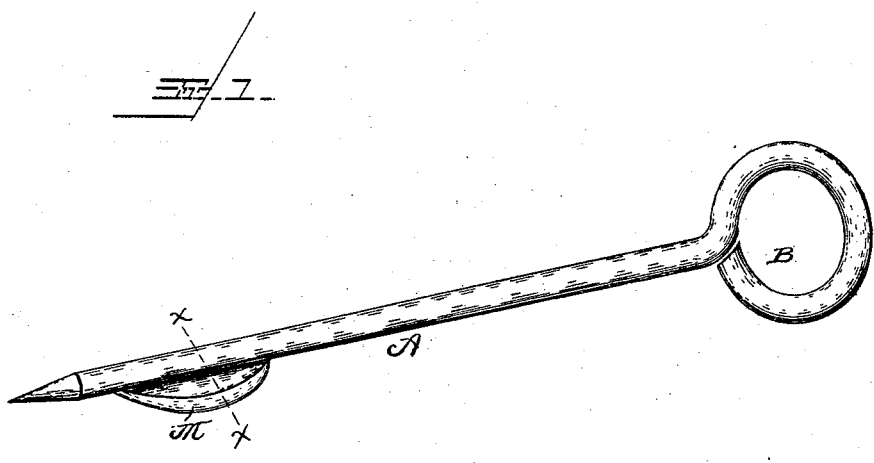
WITNESSES
E. S. Frye
G. T. Myers
G. M. Storey
INVENTOR
By Hopkins & Atkins
Attorneys.
THE NORRIS PETERS CO., PHOTO-LITHO., WASHINGTON, D. C.

UNITED STATES PATENT OFFICE.

GEORGE M. STOREY, OF AUBURN, INDIANA.

DEVICE FOR TESTING HAMS OR OTHER MEATS.

SPECIFICATION forming part of Letters Patent No. 495,382, dated April 11, 1893.

Application filed July 28, 1892. Serial No. 441,483. (No model.)

*To all whom it may concern:*

Be it known that I, GEORGE M. STOREY, a citizen of the United States, residing at Auburn, in the county of De Kalb and State of Indiana, have invented certain new and useful Improvements in Devices for Testing Hams or other Meats; and I do hereby declare the following to be a full, clear, and exact description of the invention, such as will enable others skilled in the art to which it appertains to make and use the same.

My invention has relation to improvements in devices for testing hams or other meats and it has for its object to provide a testing device adapted to remove a portion of a ham from the center or inside thereof without marring the outward appearance of the same.

To the attainment of the foregoing end, the invention consists in the peculiar construction, certain novel combinations and the adaptation of parts hereinafter described and particularly pointed out in the claim appended.

In the accompanying drawings:—Figure 1 is a perspective view of my improved device, and Fig. 2 is a transverse section of the same taken in the plane indicated by the line $x$—$x$ on Fig. 1.

Referring by letter to the said drawings:— A, indicates the shank of my improved testing device, which is provided at one end with a suitable handle as B, and has its opposite end pointed as shown, whereby it may be more readily pushed into the meat to be tested.

Suitably connected to or formed integral with the shank A, is a lip M, at one side thereof and which is preferably curved and has its edge sharpened, as shown, and is designed in practice to serve in conjunction with the shank to form a pocket to receive the portion of meat to be withdrawn from the ham.

In operation the pointed end of the shank A, is pushed into the ham or other meat a suitable distance, and the shank is turned, when the lip M, will cut a portion of the meat which will take into the pocket formed by said lip, whereby it will be seen that it may be drawn from the ham without injury thereto. When the shank and the lip carried thereby are pushed into and withdrawn from the ham or other meat, the tissues of such meat will spread but will not be torn or otherwise injured, whereby it will be readily perceived that the outward appearance of the meat will not be marred or otherwise affected.

Having thus described my invention, what I claim, and desire to secure by Letters Patent, is—

In a meat testing device, substantially as described, the combination with a shank having one of its ends sharpened; of a lip of curvilinear form carried by said shank and having its free edge sharpened; substantially as and for the purpose set forth.

In testimony whereof I affix my signature in presence of two witnesses.

GEORGE M. STOREY.

Witnesses:
E. D. HARTMAN,
J. A. CLIFTON.